United States Patent
Miyoshi (10) Patent No.: US 6,959,169 B2
(45) Date of Patent: Oct. 25, 2005

(54) WIRELESS COMMUNICATION APPARATUS AND WIRELESS COMMUNICATION METHOD

(75) Inventor: Kenichi Miyoshi, Yokohama (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 497 days.

(21) Appl. No.: 10/031,598

(22) PCT Filed: Apr. 20, 2001

(86) PCT No.: PCT/JP01/03381

§ 371 (c)(1),
(2), (4) Date: Apr. 30, 2002

(87) PCT Pub. No.: WO01/91327

PCT Pub. Date: Nov. 29, 2001

(65) Prior Publication Data

US 2002/0151301 A1 Oct. 17, 2002

(30) Foreign Application Priority Data

May 25, 2000 (JP) ........................................ 2000-155268

(51) Int. Cl.[7] .............................. H04B 7/14; H04B 1/10; H03D 1/04
(52) U.S. Cl. ........................ 455/63.1; 455/25; 455/63.4; 455/13.3; 375/346; 375/347
(58) Field of Search .............................. 455/107, 115.1, 455/120, 121, 132, 193.1, 226.1, 309, 9, 10, 13.3, 18, 25, 504, 506, 524, 525, 63.4, 67.11, 67.13, 67.16, 575.7, 63.1, 423, 424, 63; 342/360, 367; 375/303, 345, 346, 347

(56) References Cited

U.S. PATENT DOCUMENTS 5,621,769 A * 4/1997 Wan et al. .................. 375/347
6,147,645 A * 11/2000 Yukitomo et al. ........... 342/372
6,577,686 B1 * 6/2003 Koga et al. .................. 375/347
6,615,024 B1 * 9/2003 Boros et al. ............. 455/67.14
6,754,467 B1 * 6/2004 Ide et al. ....................... 455/25

FOREIGN PATENT DOCUMENTS

| EP | 0924876 A2 | * 6/1999 |
|---|---|---|
| JP | 62190934 | 8/1987 |
| JP | 04261229 | 9/1992 |
| JP | 06164316 | 6/1994 |
| JP | 10013262 | 1/1998 |
| JP | 11205209 | 7/1999 |
| JP | 2000 078115 | 3/2000 |
| WO | 9856121 | 12/1998 |

OTHER PUBLICATIONS

International Search Report dated Jun. 26, 2001.
S. Tanaka, et al.; "Performance of Coherent Adaptive Antenna Array Diversity Receiver Using the Common Antenna Weights for Rake Combined Paths for W–CDMA Reverse Link", Technical Report of IEICE, RCS99–100(Aug. 1999), pp. 97–102.

* cited by examiner

*Primary Examiner*—Rexford Barnie
(74) *Attorney, Agent, or Firm*—Stevens, Davis, Miller & Mosher, LLP (57) ABSTRACT

Likelihood determining section 111 calculates likelihood of hard decision data of a receive signal using pre-hard decision data of the received signal, and compares the calculated likelihood with a predetermined threshold 1. Switch control section 112 controls switch section 113 so that the section 113 outputs an error signal to weight control section 105 when reliability of the hard decision signal is high, corresponding to a determination signal from likelihood determining section 111. Weight control section 105 calculates a weight based on the error signal from switch section 113.

9 Claims, 8 Drawing Sheets

WIRELESS COMMUNICATION APPARATUS AND WIRELESS COMMUNICATION METHOD

TECHNICAL FIELD

The present invention relates to a wireless communication apparatus and wireless communication method with the function of performing directional transmission and reception.

BACKGROUND ART

In a digital wireless communication, an adaptive array antenna (hereinafter referred to as "AAA") technique is used which controls adaptively directivity by adding a weight to an antenna output of each of a plurality of antenna elements. In the AAA technique, it is possible to suppress interfering signals by adaptively controlling the directivity using the fact that the directions of arrival of signals are mutually different. Therefore, the adaptive array antenna technique is important as a method of canceling interfering signals on the same channel.

A radio base station apparatus that performs the AAA processing will be described. In the radio base station apparatus, signals received via a plurality of antennas are subjected to the predetermined processing such as radio reception processing and then to hard decision. Then, an error signal is generated based on the received signal with no hard decision performed thereon and the received signal (hard decision data) with the hard decision performed thereon, and based on the generated error signal, weights are calculated using an adaptive algorithm such as LMS algorithm and RLS algorithm. The radio base station apparatus multiplies received signals from antennas by respective calculated weights to form directivity, and thereby is capable of suppressing interfering signals and of improving transmission quality.

Generally, in wireless communications, it sometimes happens that the hard decision on a received signal fails due to fading and the like, and that erroneous hard decision data is obtained. A weight calculated based on the erroneous hard decision data has low accuracy, and there is a problem that desired directivity is not obtained based on the erroneous hard decision data. This problem is solved by performing error correcting processing such as Viterbi decoding and interleaving on a received signal to improve the reliability of hard decision data.

However, improving the reliability of hard decision data by the error correcting processing increases the number of processing steps of calculating the hard decision data by 1, resulting in a problem that processing delay occurs and thereby the transmission efficiency deteriorates. Since, in order to improve the error correcting effect in the error correcting processing, it is necessary to increase the constraint length to process increased data, the above-mentioned problem becomes more remarkable as the hard decision data with higher reliability is desired.

DISCLOSURE OF THE INVENTION

It is an object of the present invention to provide a wireless communication apparatus and wireless communication method capable of forming desired directivity to perform AAA transmission and reception and of decreasing processing delay.

In the AAA technique, it is possible to form desired directivity accurately by controlling weights based on hard decision data with high reliability. In this respect, as described previously, the conventional method generates hard decision data with high reliability by the error correcting processing, controls weights based on the hard decision data with high reliability, and thereby forms desired directivity.

The inventor of the present invention noted that by measuring the reliability of the hard decision data using a received signal that does not undergo the hard decision yet, and then determining whether or not to update a weight in accordance with the measured reliability, or multiplying a weight by a coefficient in accordance with the measured reliability, it is possible to control the weight using the hard decision data with high reliability even with the error correcting processing omitted, and carried out the present invention.

That is, the object of the present invention is achieved by measuring the reliability of hard decision data and adaptively controlling weights corresponding to the measured reliability.

BRIEF DESCRIPTION OF THE DRAWINGS

FIG. 11 is a diagram to explain power calculation in the radio base station apparatus according to the fourth embodiment of the present invention, as an example, in the case where a mobile station apparatus adopts QPSK modulation; and FIG. 12 is a diagram to explain power calculation in the radio base station apparatus according to the fourth embodiment of the present invention, as an example, in the case where a mobile station apparatus adopts BPSK modulation.

BEST MODE FOR CARRYING OUT THE INVENTION

Definition on terminology used in this specification will be described below before embodiments of the present invention. In the embodiments, a received signal that is not subjected to the hard decision yet is referred to as "pre-hard decision data", and a received signal subjected to the hard decision is referred to as "hard decision data".

The embodiments of the present invention will be described below specifically with reference to accompanying drawings, as an example, in a case where a wireless communication apparatus according to the present invention is a radio base station apparatus.

(First Embodiment)

Figure 1:
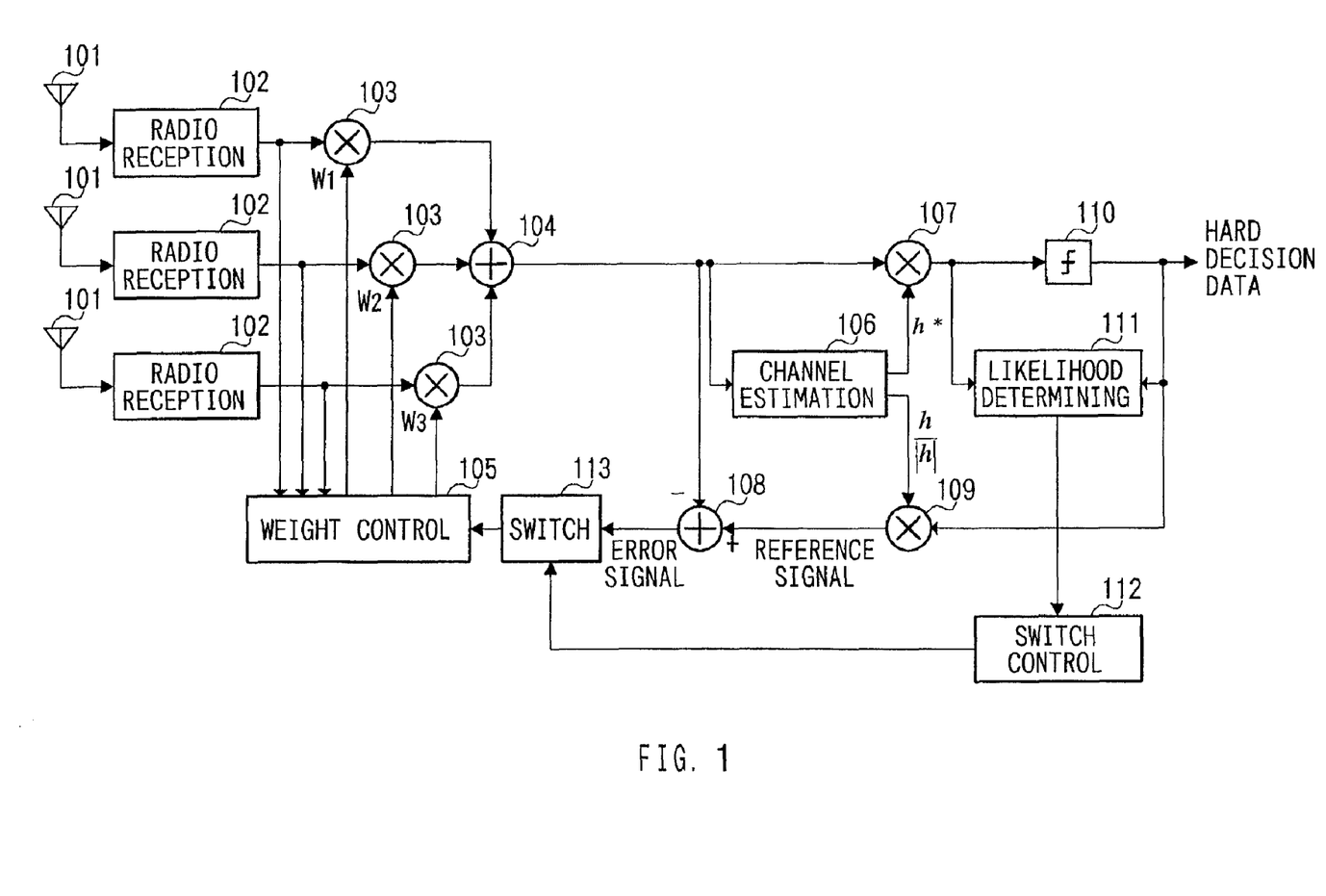
FIG. 1 is a block diagram illustrating a configuration of a radio base station apparatus according to a first embodiment of the present invention.

FIG. 1 is a block diagram illustrating a configuration of a radio base station apparatus according to the first embodiment of the present invention. The radio base station apparatus according to this embodiment determines the reliability of the hard decision data based on the likelihood for each processing timing, and by actuating a switch to on or off corresponding to the determination, determines whether or not to update a weight. In addition, the likelihood represents a probability of the hard decision data, and can be obtained using a received signal that is not subjected to the hard decision (pre-hard decision data).

The radio base station apparatus according to this embodiment is comprised of antennas 101, radio reception sections 102, multipliers 103, adder 104, weight control section 105, channel estimation section 106, multiplier 107, adder 108, multiplier 109, demodulation section 110, likelihood determining section 111, switch control section 112 and switch section 113.

Each of radio reception sections 102 performs the predetermined radio reception processing (such as down converting) on a signal received from a mobile station via respective antenna 101 to generate a baseband signal, and outputs the generated baseband signal to respective multiplier 103 and weight control section 105.

Weight control section 105 calculates a weight based on the received signal from each of radio reception sections 102 and an error signal, described below, generated in adder 108.

A weight is calculated, for example, by estimating the direction of arrival of a radio signal and using the estimation. Further, a method is used in which a weight is adaptively varied so that an error between a signal multiplied by the weight and the hard decision data of the signal is the smallest, without estimating the direction of arrival. The weight calculated in weight control section 105 is output to multiplier 103. Multiplier 103 multiplies the received data from respective radio reception section 102 by the respective weight output from weight control section 105, and outputs the signal multiplied by the weight to adder 104.

Adder 104 adds baseband signals multiplied by respective weights from respective multipliers 103, and the added baseband signal to channel estimation section 106, multiplier 107 and adder 108. Channel estimation section 106 performs channel estimation on the received signal output from adder 104, calculates channel estimation values (phase rotation amount and amplitude variation amount), and outputs the calculated channel estimation values to multiplier 107. Further, channel estimation section 106 outputs the phase rotation amount of the calculated channel estimation values to multiplier 109. Multiplier 107 multiplies in complex the received signal from adder 104 by the channel estimation value from channel estimation section 106, thereby cancels an effect of fading in the received signal, and outputs the received signal with the effect of fading cancelled to demodulation section 110 and likelihood determining section 111.

Demodulation section 110 makes the hard decision on the received signal from multiplier 107 to calculate the hard decision data. The calculated hard decision data is used in the following processing such as decoding, while being output to multiplier 109 and likelihood determining section 111.

Multiplier 109 multiplies in complex the hard decision data from demodulation section 110 by the phase shift amount from channel estimation section 106 to generate a reference signal, and outputs the generated reference signal to adder 108. Adder 108 obtains a difference between the reference signal (hard decision data multiplied in complex by the phase rotation amount) and the received signal from adder 104, and outputs the calculated difference as an error signal to switch section 113. Switch section 113 temporarily stores the error signal from adder 108 until a control timing of switch control section 112.

Likelihood determining section 111 obtains the likelihood based on the received signal (pre-hard decision data), which is not subjected to the hard decision yet, from adder 107, and the hard decision data from demodulation section 110, and compares the obtained likelihood with a predetermined threshold to make a threshold determination.

Switch control section 112 refers to the threshold determination result in likelihood determining section 111 to control switch section 113. Switch section 113 outputs the error signal to weight control section 105 according to the control of switch control section 112.

Based on the error signal output from switch section 113, weight control section 105 calculates a weight that minimizes the mean square error between the reference signal and the received signal. As an algorithm to calculate a weight, adaptive algorithms such as LMS algorithm and RLS algorithm may be used. In addition, the present invention is not limited to the above-mentioned algorithms, and is capable of using various adaptive algorithms.

The operation of the radio base station apparatus with the above configuration will be described below.

A received signal, from a mobile station, AAA-received with the directivity is subjected to the hard decision in demodulation section 110 to be the hard decision data, and the hard decision data is used in the following processing such as decoding, while being output to likelihood determining section 111. Based on the received signal (pre-hard decision data) that is not subjected to the hard decision yet and the hard decision data, likelihood determining section 111 obtains the likelihood, and makes a threshold determination on the likelihood with a predetermined threshold 1.

The threshold determination on the likelihood in likelihood determining section 111 will be described below.

Since the threshold determination in likelihood determining section 111 varies with modulation method adopted in a mobile station, cases will be described separately that a mobile station adopts QPSK modulation, and that a mobile station adopts BPSK modulation.

Figure 2:
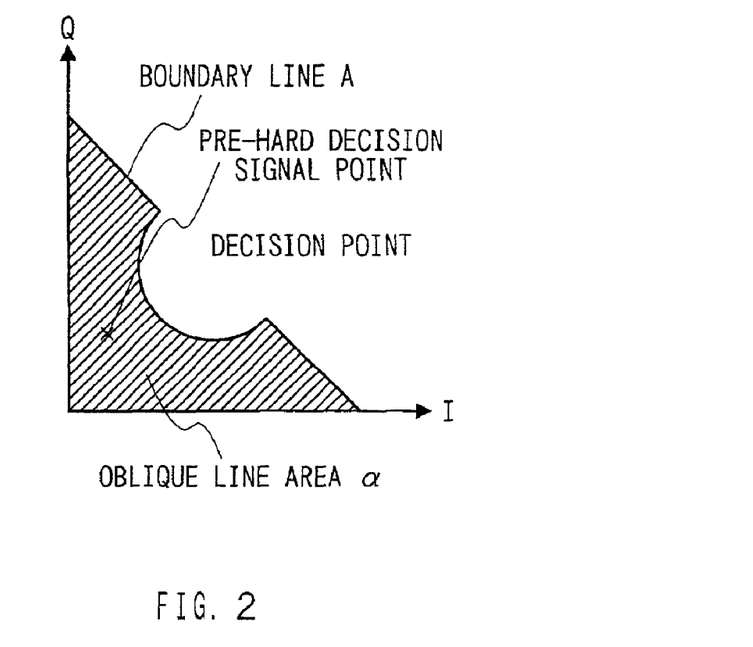
FIG. 2 is a diagram to explain a threshold determination on likelihood in the radio base station apparatus according to the first embodiment of the present invention, as an example, in a case where a mobile station apparatus adopts QPSK modulation.

First, the case that a mobile station adopts QPSK modulation will be described with reference to FIG. 2. FIG. 2 is a diagram to explain the threshold determination on likelihood performed in likelihood determining section 110 in the radio base station apparatus according to this embodiment, as an example, in the case where a mobile station adopts QPSK modulation. In FIG. 2, the abscissa (I-axis) indicates an in-phase component of a received signal, and the ordinate (Q-axis) indicates a quadrature component of the received signal.

Oblique line area α illustrated in FIG. 2 is an area where the likelihood is determined as low. The likelihood becomes lower, as I and Q components of a signal point are smaller and as the Euclid distance from a decision point representative of the hard decision data is longer. Accordingly, oblique line area α is as illustrated in FIG. 2 with boundary line A as a boundary. Boundary line A corresponds to the threshold 1 for which likelihood determining section 111 is set. In addition, a similar oblique line area is set on each of the second to fourth quadrants, and since the threshold determination is performed in a similar manner to the first quadrant, the first quadrant is only illustrated to simplify the description.

The signal (pre-hard decision data), which is not subjected to the hard decision yet, from multiplier 107 is mapped onto the I-Q plane by likelihood determining section 111. Hereinafter a point onto which the signal from multiplier 107, which is not subjected to the hard decision yet, is mapped is referred to as a pre-hard decision signal point. Likelihood determining section 111 makes the threshold determination by determining whether or not the pre-hard decision signal point belongs to oblique line area α. In other words, when the pre-hard decision signal point does not belong to oblique line area α, the likelihood of the hard decision data of the signal is determined as high, and a determination signal indicative of such a determination is output to switch control section 112. On the other hand, when the pre-hard decision signal point belongs to oblique line area α, the likelihood of the hard decision data of the signal is determined as low, and a determination signal indicative of such a determination is output to switch control section 112.

Referring to FIG. 1 again, the operation of the radio base station apparatus according to this embodiment will be described further.

According to the determination signal, switch control section 112 switches on or off switch section 113. Specifically, when the determination signal indicative of the likelihood being low is input from likelihood determining section 111, the section 112 switches off switch section 113. In this case, the error signal generated in adder 108 is not output to weight control section 105, and the weight is not updated. On the other hand, when the determination signal indicative of the likelihood being high is input from likelihood determining section 111, the section 112 switches on switch section 113, and the error signal generated in adder 108 is output to weight control section 105.

Based on the error signal input from adder 108 via switch section 113, weight control section 105 estimates the direction of arrival of the radio signal, and calculates a new weight using the estimation of the direction of arrival.

In this way, only when the likelihood is determined as high in likelihood determining section 111, the error signal calculated in adder 108 is output to weight control section 105, so that the new weight is calculated. Meanwhile, when the likelihood is determined as low in likelihood determining section 111, the weight is not updated, and the same weight as used at the last control timing is used for AAA-reception.

Thus, in the radio base station apparatus according to this embodiment, likelihood determining section 111 compares the likelihood obtained from the pre-hard decision data with a threshold to make a threshold determination, and when the section 111 determines that the likelihood is higher than the threshold, the error signal is input to weight control section 105. Weight control section 105 thereby calculates a weight based on the hard decision data with high reliability output from switch section 113. Accordingly, using the pre-hard decision data that is not subjected to error correction, the reliability of the hard decision data is determined, and based on the hard decision data determined to have high reliability, the weight is calculated and updated, whereby it is possible to calculate weights accurately to form desired directivity without performing the processing such as error correcting processing after demodulation, and to decrease processing delay.

Figure 3:
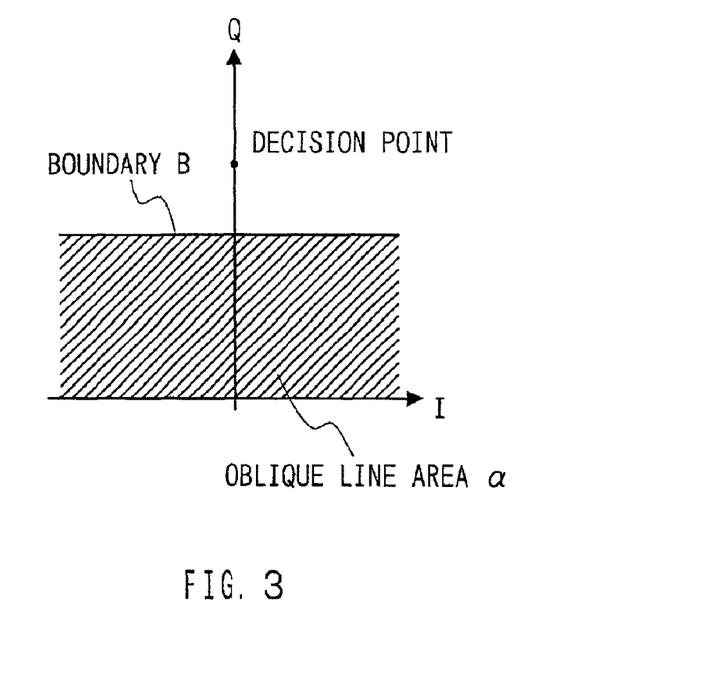
FIG. 3 is a diagram to explain a threshold determination on likelihood in the radio base station apparatus according to the first embodiment of the present invention, as an example, in a case where a mobile station apparatus adopts BPSK modulation.

Next, with reference to FIG. 3, the threshold determination on likelihood will be described which is performed in likelihood determining section 111 when a mobile station apparatus adopts BPSK modulation. FIG. 3 is a diagram to explain the threshold determination on likelihood performed in likelihood determining section 111 in the radio base station apparatus according to this embodiment, as an example, in the case where a mobile station apparatus adopts BPSK modulation.

In BPSK, since the likelihood is lower as the absolute value of a Q component of a point onto which a signal is mapped is smaller, in FIG. 3 an area where absolute values of Q components are small is set as oblique line area α with boundary line B as a boundary. In BPSK modulation, boundary line B corresponds to the threshold 1 in likelihood determining section 111. Likelihood determining section 111 makes the threshold determination by determining whether or not the pre-hard decision signal point belongs to thus set oblique line area α. The determination signal indicative of the threshold determination result is output to switch control section 112 in the same as in the case of QPSK, and corresponding to the determination signal, switch control section 112 controls switch section 113.

Thus, also when a mobile station adopts BPSK modulation, it is possible to calculate weights accurately to form desired directivity without performing the processing such as error correcting processing after demodulation, and to decrease processing delay.

In addition, while this embodiment describes the case where a threshold is set as illustrated in FIGS. 2 and 3, the present invention is not limited to the above case. The threshold may be varied and set as appropriate corresponding to the distribution of likelihood of received signal. That is, when the threshold is set at a high level, it is possible to update a weight using the hard decision data with high likelihood, but since the number of hard decision data items for use in updating the weight is decreased, a weight update rate becomes low. Meanwhile, when the threshold is set at a low level, the weight is updated sometimes with hard decision data with low likelihood, but the weight is updated at a high rate. Accordingly, the threshold is varied and set as appropriate taking into account the accuracy of hard decision data and weight update rate.

(Second Embodiment)

The radio base station apparatus illustrated in FIG. 1 determines reliability of hard decision data based on likelihood, and calculates and updates a weight based on the hard decision data with high reliability. In this case, since the processing for calculating the likelihood is needed in addition to general AAA processing, it is considered that an apparatus scale is expanded.

In wireless communications, in general, as the received power is higher, the hard decision becomes less erroneous and the reliability of the hard decision data is higher. Therefore, it is possible to determine the reliability of hard decision data based on the received power. Since the measurement of received power is such processing that a radio base station apparatus generally performs, the processing load is decreased by determining the reliability of the hard decision data based on the received power, thereby providing an advantageous effect of enabling a miniaturized radio base station apparatus.

Then, the radio base station apparatus according to this embodiment determines the reliability of hard decision data based on the received power of a received signal, calculates a weight based on the hard decision data with high reliability, and using the calculated weight, performs AAA transmission and reception.

Figure 4:
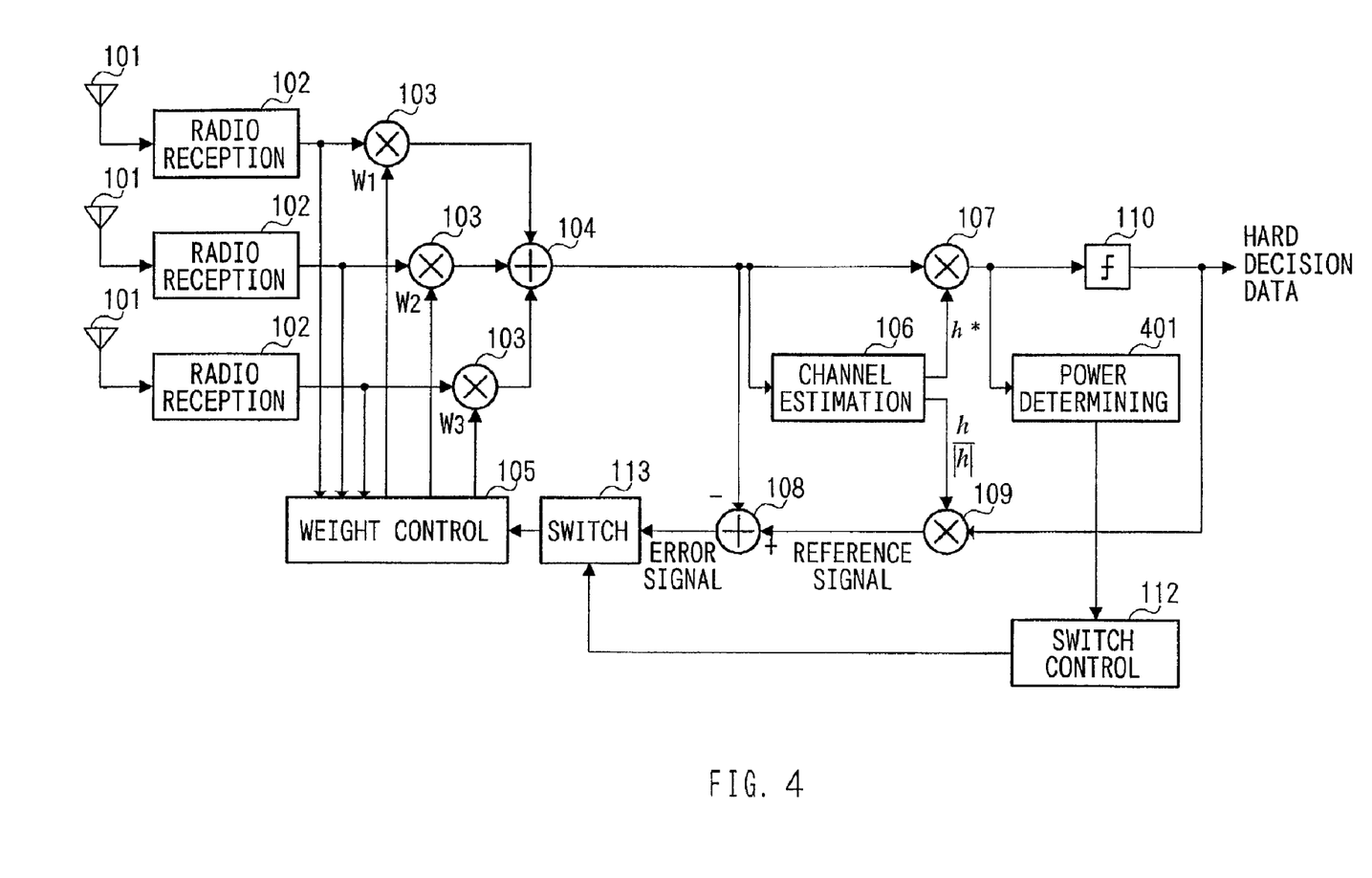
FIG. 4 is a block diagram illustrating a configuration of a radio base station apparatus according to a second embodiment of the present invention.

FIG. 4 is a block diagram illustrating a configuration of the radio base station apparatus according to the second embodiment of the present invention. As illustrated in FIG. 4, the radio base station apparatus according to this embodiment is provided with power determining section 401, instead of likelihood determining section 111 in the radio base station apparatus illustrated in FIG. 1. The radio base station apparatus according to this embodiment determines the reliability of the hard decision data based on the received power (power of pre-hard decision data) for each processing timing, and by actuating a switch to on or off corresponding to the determination, determines whether or not to update a weight. In addition, in FIG. 4 the same sections as in FIG. 1 are assigned the same reference numerals as in FIG. 1 to omit specific descriptions thereof.

A received signal is subjected to AAA reception, and is multiplied in complex by the channel estimation value in multiplier 107, and the resultant is output to demodulation section 110 and power determining section 401. The received signal, multiplied in complex by the channel estimation value in multiplier 107, is mapped onto the I-Q plane in power determining section 401, and the received power is estimated from the mapped point. The estimated received power is compared with a predetermined threshold 2. When the received power is smaller than the predetermined threshold 2, a determination signal indicative of the reliability of the hard decision data being low is output to switch control section 112. On the other hand, when the received power is greater than the predetermined threshold 2, a determination signal indicative of the reliability of the hard decision data being high is output to switch control section 112. Switch control section 112 controls switch section 113 as in the first embodiment.

The threshold determination performed in power determining section 401 will be described specifically below. Since the threshold determination in power determining section 401 varies with modulation method adopted in a mobile station, cases will be described separately that a mobile station adopts QPSK modulation, and that mobile station adopts BPSK modulation.

Figure 5:
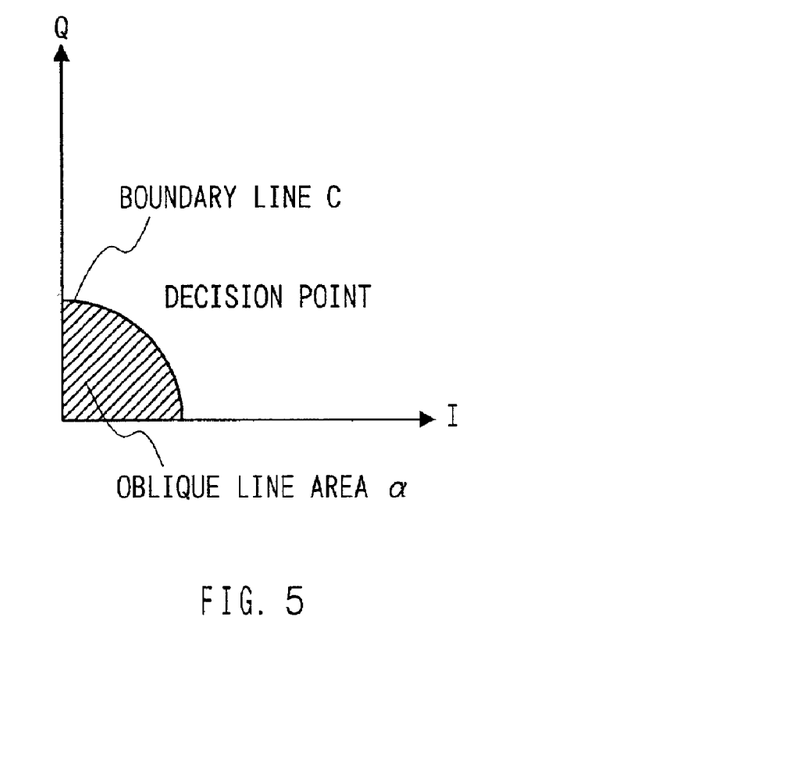
FIG. 5 is a diagram to explain a threshold determination on received power in the radio base station apparatus according to the second embodiment of the present invention, as an example, in the case where a mobile station apparatus adopts QPSK modulation.

First, the case that a mobile station adopts QPSK modulation will be described with reference to FIG. 5. FIG. 5 is a diagram to explain the threshold determination performed in power determining section 401 in the radio base station apparatus according to this embodiment, as an example, in the case where a mobile station apparatus adopts QPSK modulation. In FIG. 5, the abscissa (I-axis) indicates an in-phase component of a received signal, and the ordinate (Q-axis) indicates a quadrature component of the received signal. Since the power of a received signal is lower as the distance of the signal point from the origin is shorter, an area where the distance from the origin is short is set as oblique line area α with boundary line C as a boundary. Boundary line C corresponds to the threshold 2 in power determining section 401.

In power determining section 401, the pre-hard decision signal (pre-hard decision data) from multiplier 107 is mapped onto the I-Q plane. Then, it is determined whether or not the mapped point (pre-hard decision signal point) belongs to oblique line area α. When the pre-hard decision signal point belongs to oblique line area α, the reliability of the hard decision data of the signal is determined as high, and a determination signal indicative of such a determination is output to switch control section 112. Meanwhile, when the pre-hard decision signal point does not belong to oblique line area α, the reliability of the hard decision data of the signal is determined as high, and a determination signal indicative of such a determination is output to switch control section 112.

According to the determination signal from power determining section 401, switch control section 112 switches on or off switch section 113 as in the first embodiment. Specifically, when the determination signal indicative of the reliability of the hard decision data being high is input, the section 112 switches on switch section 113, and the error signal generated in adder 108 is output to weight control section 105. Weight control section 105 calculates a new weight as in the first embodiment.

Thus, in the radio base station apparatus according to this embodiment, the reliability of the hard decision data is determined using the power of a received signal that is not subjected to error correction, and based on the hard decision data determined to have high reliability, the weight is calculated and updated, whereby it is possible to calculate weights accurately to form desired directivity without performing the processing such as error correcting processing after demodulation, and to decrease processing delay. Further since the reliability of the hard decision data is determined based on the received power, it is possible to reduce the processing load and to miniaturize the apparatus configuration.

Figure 6:
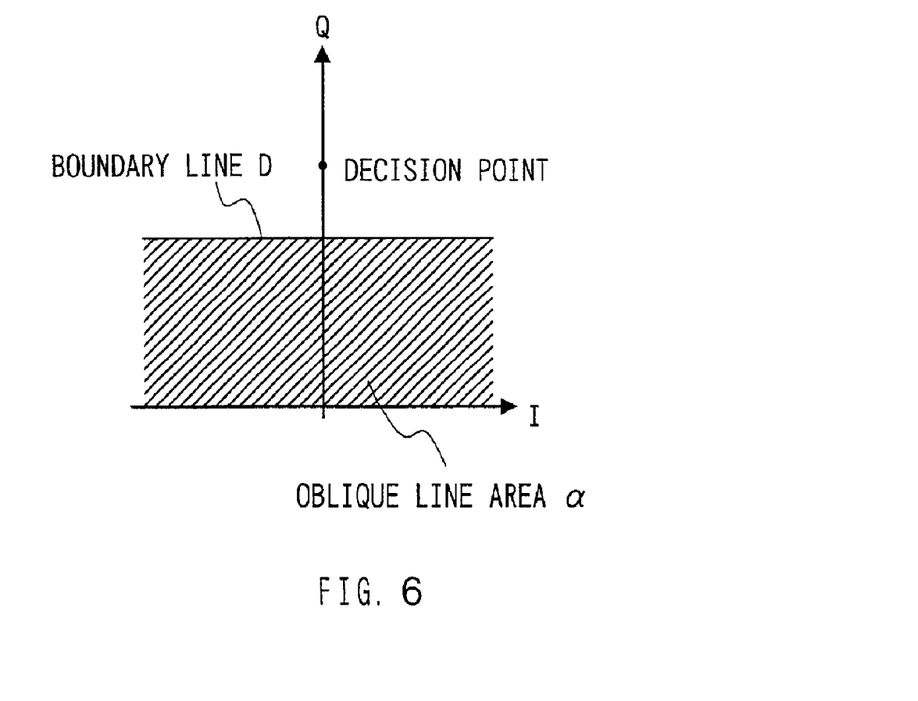
FIG. 6 is a diagram to explain a threshold determination on received power in the radio base station apparatus according to the second embodiment of the present invention, as an example, in the case where a mobile station apparatus adopts BPSK modulation.

With reference to FIG. 6, the threshold determination on the hard decision data will be described which is performed in power determining section 401 when a mobile station adopts BPSK modulation. FIG. 6 is a diagram to explain the threshold determination on the hard decision data performed in power determining section 401 in the radio base station apparatus according to this embodiment, as an example, in the case where a mobile station apparatus adopts BPSK modulation.

Oblique line area α illustrated in FIG. 6 is an area where the reliability of the hard decision data is determined as low. In BPSK, since the power of a received signal is lower as the distance of the signal point from the I-axis is shorter, an area where the distance from the I-axis is short is set as oblique line area α with boundary line D as a boundary. In the case of BPSK modulation, boundary line D corresponds to the threshold 2 in power determining section 401. Power determining section 401 makes the threshold determination by determining whether or not the pre-hard decision signal point belongs to oblique line area α, and outputs the determination to switch control section 112. Switch control section 112 controls switch section 113 as in the case of QPSK described previously. In this way only when the reliability of the hard decision data is high, the error signal is output to weight control section 105, and the weight is calculated and updated.

Thus, also when a mobile station adopts BPSK modulation, it is possible to calculate weights accurately to form desired directivity without performing the processing such as error correcting processing after demodulation, and to decrease processing delay.

In addition, while in this embodiment the received power is estimated based on the output of multiplier 107, the present invention is not limited to the foregoing. It may be possible to estimate the received power based on an output of a section other than multiplier 107 to make the threshold determination. For example, it may be possible to use the received power estimated in channel estimation section 106 to make the threshold determination.

(Third Embodiment)

The radio base station apparatuses according to the first and second embodiments make the threshold determination by comparing, respectively, the likelihood and received power with a single threshold, update a weight only when the reliability of the hard decision data is determined as high from the determination, and thereby calculate weights accurately based on the hard decision data with high reliability.

However, when the reliability of the hard decision data is determined as low but the pre-hard decision data has a value similar to a threshold, it is considered that the hard decision data has the reliability to some extent. Then, the third and fourth embodiments describe a case where error signals are weighted corresponding to the reliability of the hard decision data, and weights are controlled based on the weighted error signals.

Figure 7:
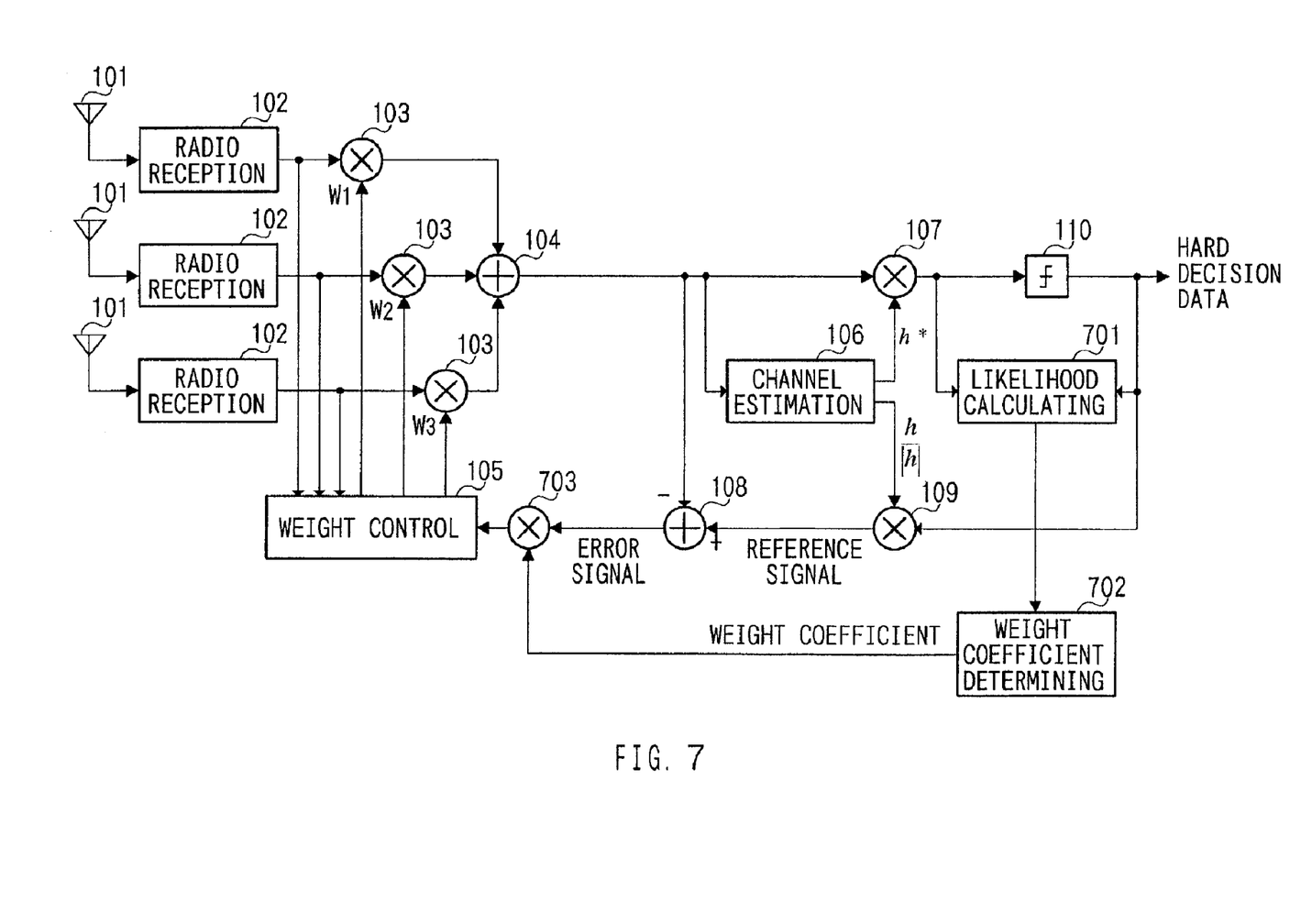
FIG. 7 is a block diagram illustrating a configuration of a radio base station apparatus according to a third embodiment of the present invention.

FIG. 7 is a block diagram illustrating a configuration of the radio base station apparatus according to the third embodiment of the present invention. As illustrated in FIG. 7, the radio base station apparatus according to this embodiment is provided with likelihood calculating section 701, weight coefficient determining section 702, and multiplier 703, respectively, instead of likelihood determining section 111, switch control section 112, and switch section 113 in the radio base station apparatus illustrated in FIG. 1. The radio base station apparatus according to this embodiment calculates a weight coefficient corresponding to the likelihood for each processing timing, and multiplies a weight by the calculated weight coefficient to adaptively calculate the weight. In addition, in FIG. 7 the same sections as in FIG. 1 are assigned the same reference numerals as in FIG. 1 to omit specific descriptions thereof.

Likelihood calculating section 701 calculates the likelihood based on the received data, which is not subjected to the hard decision yet, from multiplier 107, and the hard decision data from demodulation section 110, and outputs the calculated likelihood to weight coefficient determining section 702. Weight coefficient determining section 702 stores a table associating the likelihood with the weight coefficient. The weight coefficient takes a value ranging from 0.0 to 1.0, and has a greater value, as the likelihood is higher. Weight coefficient determining section 702 refers to the stored table to determine a weight coefficient, and outputs the determined weight coefficient to multiplier 703. Multiplier 703 multiplies the error signal from adder 108 by the weight coefficient from weight coefficient determining section 702, and outputs the error signal multiplied by the weight coefficient to weight control section 105. Weight control section 105 calculates a weight based on the error signal, multiplied by the weight coefficient, from multiplier 703.

The operation of the radio base station apparatus with the above configuration will be described next. A received signal is subjected to AAA reception, and is multiplied in complex by the channel estimation value in multiplier 107, and the resultant is output to demodulation section 110 and likelihood calculating section 701. The received signal, multiplied in complex by the channel estimation value in multiplier 107, is mapped onto the I-Q plane in likelihood calculating section 701, and the likelihood is calculated from the mapped point. The calculated likelihood is output to weight coefficient determining section 702. Weight coefficient determining section 702 refers to the beforehand stored table associating the likelihood with the weight coefficient, and determines a weight coefficient corresponding to the likelihood from likelihood calculating section 701. The weight coefficient determined in weight coefficient determining section 702 is output to multiplier 703, and multiplier 703 multiplies the weight coefficient by the error signal from adder 108. The error signal multiplied by the weight coefficient is output to weight control section 105. Weight control section 105 estimates the direction of arrival of the radio signal based on the error signal multiplied by the weight coefficient from multiplier 703, and calculates the weight.

The likelihood calculation in likelihood calculating section 701 will be described below.

Since the likelihood calculation in likelihood calculating section 701 varies with modulation method adopted in a mobile station, cases will be described separately that a mobile station adopts QPSK modulation, and that a mobile station adopts BPSK modulation.

Figure 8:
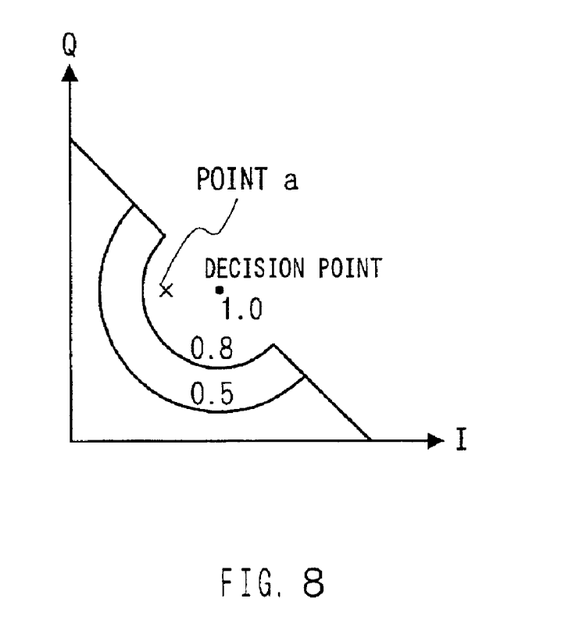
FIG. 8 is a diagram to explain a calculation of likelihood in the radio base station apparatus according to the third embodiment of the present invention, as an example, in the case where a mobile station apparatus adopts QPSK modulation.

First, the case that a mobile station adopts QPSK modulation will be described with reference to FIG. 8. FIG. 8 is a diagram to explain the likelihood calculation performed in likelihood calculating section 701 in the radio base station apparatus according to this embodiment, as an example, in the case where a mobile station adopts QPSK modulation. In FIG. 8, the abscissa (I-axis) indicates an in-phase component of a received signal, and the ordinate (Q-axis) indicates a quadrature component of the received signal. The likelihood of the hard decision data is higher, as the distance of the point is longer from the origin and is shorter from the decision point. Therefore, the likelihood distribution as illustrated in FIG. 8 is set on the I-Q plane. As illustrated in FIG. 8, the likelihood is set at 1.0 in the vicinity of the decision point, while being set at a smaller value as the point is further from the decision point. The likelihood is set at 0.8 in the range from the decision point to the inside of an arc of a semicircle with the decision point as the center, while being set at 0.5 in the range from the arc to the other outer arc.

It is assumed that the pre-hard decision received signal (pre-hard decision data) from multiplier 107 is mapped onto point a on the I-Q plane. The likelihood of point a is calculated as 0.8 according to the predetermined likelihood distribution illustrated in FIG. 8. The calculated likelihood is output to weight coefficient determining section 702. Weight coefficient determining section 702 refers to the table, and determines the weight coefficient corresponding to the likelihood of 0.8. Multiplier 703 multiplies the error signal from adder 108 by the weight coefficient determined in weight coefficient determining section 702. The multiplication result is output to weight control section 105, which calculates a weight.

Thus, the radio base station apparatus according to this embodiment determines a weight coefficient corresponding to the likelihood obtained using the pre-hard decision data that is not subjected to error correction yet, and calculates a weight based on the error signal multiplied by the determined weight coefficient. Accordingly, it is possible to calculate weights accurately to form desired directivity without performing the processing such as error correcting processing after demodulation, and to decrease processing delay. Further, since the weight is updated to a greater value as the likelihood of the hard decision data is higher, it is possible to calculate weights more accurately than the case described in the first embodiment to form desired directivity.

Figure 9:
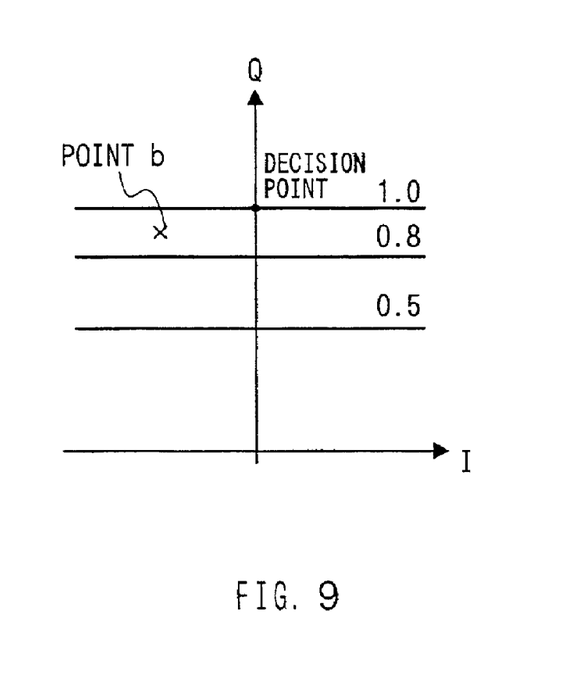
FIG. 9 is a diagram to explain a calculation of likelihood in the radio base station apparatus according to the third embodiment of the present invention, as an example, in the case where a mobile station apparatus adopts BPSK modulation.

With reference to FIG. 9, the likelihood calculation will be described next which is performed in likelihood calculating section 701 when a mobile station apparatus adopts BPSK modulation. FIG. 9 is a diagram to explain the likelihood calculation performed in likelihood calculating section 701 in the radio base station apparatus according to this embodiment, as an example, in the case where a mobile station apparatus adopts BPSK modulation. In FIG. 9, the abscissa (I-axis) indicates an in-phase component of a received signal, and the ordinate (Q-axis) indicates a quadrature component of the received signal. The likelihood of the hard decision data is higher, as the distance of the point is longer from the origin and is shorter from the decision point. Therefore, the likelihood distribution as illustrated in FIG. 9 is set on the I-Q plane. The likelihood is set at 1.0 in the vicinity of the decision point, while being set at a smaller value as the point is further from the decision point.

It is assumed that the pre-hard decision received signal (pre-hard decision data) from multiplier 107 is mapped onto point b on the I-Q plane. The likelihood of point b is calculated as 0.8 according to the predetermined likelihood distribution illustrated in FIG. 9. The calculated likelihood is output to weight coefficient determining section 702. Weight coefficient determining section 702 refers to the table, and determines the weight coefficient corresponding to the likelihood of 0.8. Multiplier 703 multiplies the error signal from adder 108 by the weight coefficient determined in weight coefficient determining section 702. The multiplication result is output to weight control section 105, which calculates a weight.

Thus, also when a mobile station adopts BPSK modulation, since the weight is updated to a greater value as the likelihood of the hard decision data is higher, it is possible to calculate weights more accurately than the case described in the first embodiment to form desired directivity.

In addition, this embodiment describes the case where the table associating the likelihood with the weight coefficient is stored, and referring to the table, the weight coefficient is determined corresponding to the likelihood. However, the present invention is not limited to the above case, and it may be possible to determine the likelihood as the weight coefficient.

Further, while this embodiment describes the distribution of the likelihood on the I-Q plane using the distributions illustrated in FIGS. 8 and 9 as examples, the present invention is not limited to the foregoing. It may be possible to vary the distribution as appropriate corresponding to the distribution of the likelihood of received signals. Moreover, it may be possible to update as appropriate the table for use in calculating weight coefficients, and perform control for varying adaptively weight coefficients so that the reception error rate is the least.

(Fourth Embodiment)

A radio base station apparatus according to this embodiment multiplies the error signal by a weight coefficient corresponding to the calculated received power, and performs AAA reception using weights controlled based on error signals multiplied by respective weight coefficients.

Figure 10:
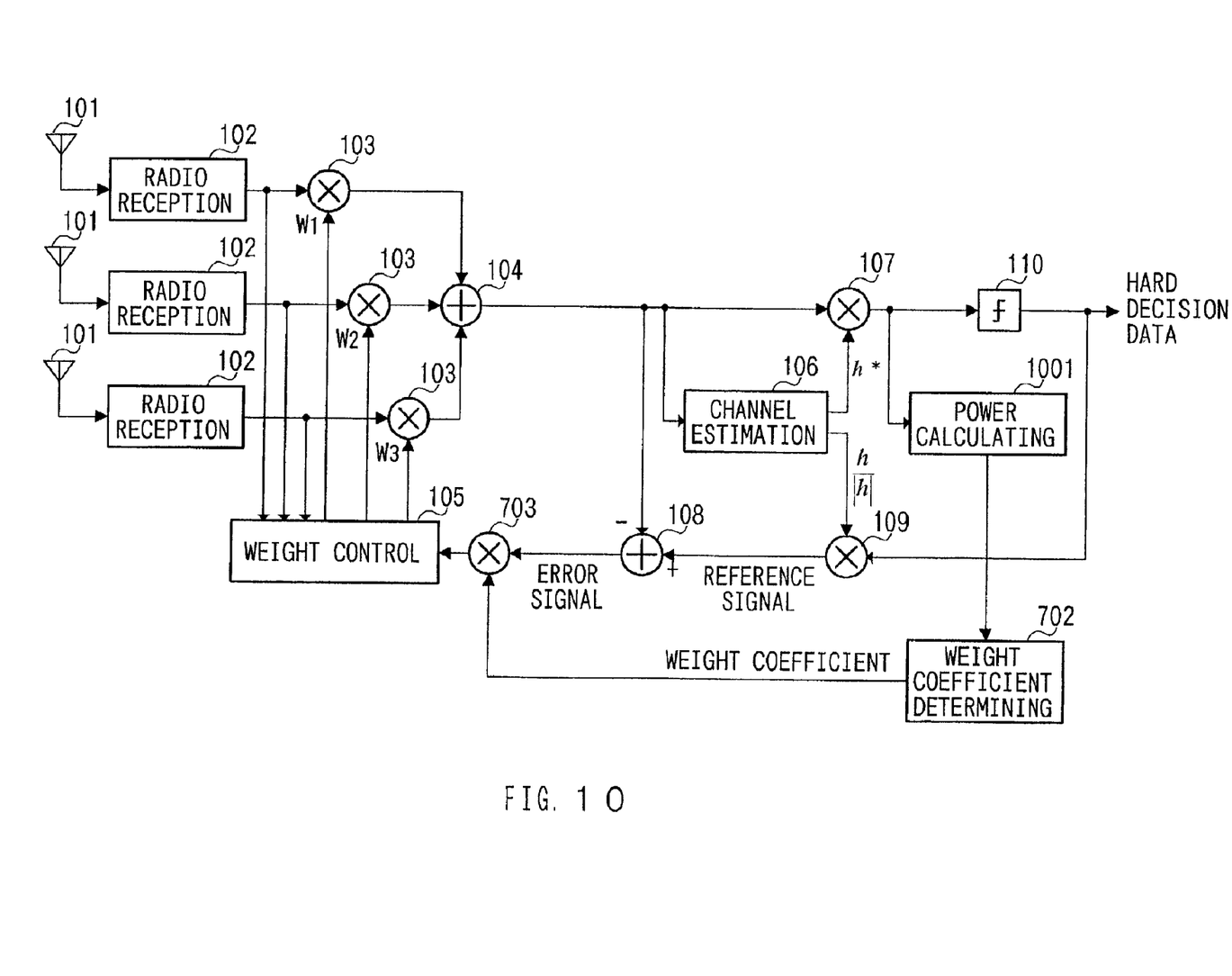
FIG. 10 is a block diagram illustrating a configuration of a radio base station apparatus according to a fourth embodiment of the present invention.

FIG. 10 is a block diagram illustrating a configuration of the radio base station apparatus according to the fourth embodiment of the present invention. As illustrated in FIG. 10, the radio base station apparatus according to this embodiment is provided with power calculating section 1001, instead of likelihood calculating section 701 in the radio base station apparatus illustrated in FIG. 7. The radio base station apparatus according to this embodiment multiplies the error signal by a weight coefficient corresponding to the received power for each processing timing, and performs AAA transmission and reception using weights controlled based on error signals multiplied by respective weight coefficients. In addition, in FIG. 10 the same sections as in FIG. 7 are assigned the same reference numerals as in FIG. 7 to omit specific descriptions thereof.

Power calculating section 1001 calculates the received power based on the pre-hard decision data from multiplier 107, and outputs the calculated received power to weight coefficient determining section 702. Weight coefficient determining section 702 stores a table associating the received power with the weight coefficient. The weight coefficient takes a value raging from 0.0 to 1.0, and has a greater value, as the received power is higher. Weight coefficient determining section 702 refers to the stored table to determine a weight coefficient, and outputs the determined weight coefficient to multiplier 703.

The operation of the radio base station apparatus with the above configuration will be described next.

A received signal is subjected to AAA reception, and is multiplied in complex by the channel estimation value in multiplier 107, and the resultant is output to demodulation section 110 and power calculating section 1001. The received signal (pre-hard decision data), multiplied in complex by the channel estimation value in multiplier 107, is mapped onto the I-Q plane in power calculating section 1001, and the received power is calculated from the mapped point. The calculated received power is output to weight coefficient determining section 702. Weight coefficient determining section 702 determines a weight coefficient based on the received power from power calculating section 1001. The weight coefficient determined in weight coefficient determining section 702 is output to multiplier 703, and multiplier 703 multiplies the weight coefficient by the error signal from adder 108. The error signal multiplied by the weight coefficient is output to weight control section 105. Weight control section 105 estimates the direction of arrival of the radio signal based on the error signal multiplied by the weight coefficient from multiplier 703, and calculates the weight.

The received power calculation in power calculating section 1001 will be described below. Since the received power calculation in power calculating section 1001 varies with modulation method adopted in a mobile station, cases will be described separately that a mobile station adopts QPSK modulation, and that a mobile station adopts BPSK modulation.

First, the case that a mobile station adopts QPSK modulation will be described with reference to FIG. 11. FIG. 11 is a diagram to explain the power calculation performed in power calculating section 1001 in the radio base station apparatus according to this embodiment, as an example, in the case where a mobile station adopts QPSK modulation. As illustrated in FIG. 11, the received power is set so that the power is calculated to a greater value as the point is further from the origin, while being calculated to 1.0 in the vicinity of the decision point.

It is assumed that the pre-hard decision received signal (pre-hard decision data) from multiplier 107 is mapped onto point c on the I-Q plane. The received power of point c is calculated as 0.8 according to the predetermined received power distribution illustrated in FIG. 11. The calculated received power is output to weight coefficient determining section 702. Weight coefficient determining section 702 refers to the table, and determines the weight coefficient corresponding to the received power of 0.8. Multiplier 703 multiplies the error signal from adder 108 by the weight coefficient determined in weight coefficient determining section 702. The multiplication result is output to weight control section 105, which calculates a weight.

Thus, the radio base station apparatus according to this embodiment determines a weight coefficient corresponding to the received power of a received signal that is not subjected to error correction yet, and calculates a weight based on the error signal multiplied by the determined weight coefficient. Accordingly, it is possible to calculate weights accurately to form desired directivity without performing the processing such as error correcting processing after demodulation, and to decrease processing delay. Further, since the weight is updated to a greater value as the received power of the received signal is higher, it is possible to calculate weights more accurately than the case described in the second embodiment to form desired directivity. Furthermore, since the weight coefficient is determined using the received power, it is possible to reduce the processing load and to miniaturize the apparatus configuration.

With reference to FIG. 12, the received power calculation will be described next which is performed in power calculating section 1001 when a mobile station apparatus adopts BPSK modulation. FIG. 12 is a diagram to explain the received power calculation performed in power calculating section 1001 in the radio base station apparatus according to this embodiment, as an example, in the case where a mobile station adopts BPSK modulation. The received power is set so that the power is calculated to a greater value as the point is further from the origin, while being calculated to 1.0 in the vicinity of the decision point.

It is assumed that the pre-hard decision received signal (pre-hard decision data) from multiplier 107 is mapped onto point d on the I-Q plane. The received power of point d is calculated as 0.8 according to the predetermined received power distribution set on the I-Q plane illustrated in FIG. 12. The calculated received power is output to weight coefficient determining section 702. Weight coefficient determining section 702 refers to the table, and determines the weight coefficient corresponding to the received power of 0.8. Multiplier 703 multiplies the error signal from adder 108 by the weight coefficient determined in weight coefficient determining section 702. The multiplication result is output to weight control section 105, which calculates a weight.

Thus, also when a mobile station adopts BPSK modulation, it is possible to calculate weights more accurately than the case described in the second embodiment to form desired directivity, to reduce the processing load, and to miniaturize the apparatus configuration.

In addition, this embodiment describes the case where the table associating the calculated received power with the weight coefficient is stored, and referring to the table, the weight coefficient is determined corresponding to the received power. However, the present invention is not limited to the above case, and it may be possible to determine the received power as the weight coefficient.

Further, while this embodiment describes the distribution of the received power on the I-Q plane using the distributions illustrated in FIGS. 11 and 12 as examples, the present invention is not limited to the foregoing. It may be possible to vary the distribution as appropriate corresponding to the distribution of the power of received signals. Moreover, it may be possible to update as appropriate the table for use in calculating weight coefficients, and perform control for varying adaptively weight coefficients so that the reception error rate is the least.

Furthermore, while in the present invention QPSK modulation and BPSK modulation are described as examples as a modulation scheme adopted in a mobile station, the present invention is not limited to the foregoing. It may be possible to another modulation scheme enabling the radio base station apparatus to determine the reliability of the hard decision data. For example, QAM modulation may be adopted.

In addition, although the operation on a receiving side of the radio base station apparatus according to the present invention is described, it is possible to improve transmission quality in transmitting signals by performing directional transmission according to the directivity formed in weight control section 105.

Further, although in the present invention an example of the operation in the radio base station apparatus is only described, it is possible to improve reception quality and transmission quality in the similar operation in a mobile station apparatus mounted with an adaptive array antenna reception apparatus.

As can be obvious to those skilled in the art, the present invention may be carried out using a commercially available digital computer and micro processor installed with a program for operating techniques described in the above embodiments. Further, as can be obvious to those skilled in the art, the present invention includes computer programs created by those skilled in the art based on the techniques described in the above embodiments.

Further, the scope of the present invention includes computer program products such as computer readable storage media storing a program for operating the techniques described in the above embodiments. The storage media include disks such as a floppy disk, optical disk, CD-ROM and magnetic disk, ROM, RAM, EPROM, EEPROM, opto-magnetic card, memory card and DVD, but are not limited to the above products.

As described above, according to the present invention, weights are controlled based on signals with high reliability of the hard decision data without performing error correcting processing, and it is thereby possible to form desired directivity to perform AAA transmission and reception, and to decrease the processing delay.

This application is based on the Japanese Patent Application No. 2000-155268 filed on May 25, 2000, entire content of which is expressly incorporated by reference herein.

INDUSTRIAL APPLICABILITY

The present innovation is suitable for being used in fields of wireless communication apparatus and wireless communication method having the function of performing directional transmission and reception.

What is claimed is:

1. A wireless communication apparatus comprising:
   a plurality of antennas;
   a first multiplier that multiplies a plurality of signals received though the plurality of antennas by respective weights provided for directional reception;
   an adder that adds the signals multiplied by the weights to obtain a received signal;
   a demodulator that performs a hard decision of the received signal to obtain hard decision data; and
   a controller that controls the weights,
   wherein the controller switches between updating and not updating the weights depending on a reliability of the hard decision data.

2. The wireless communication apparatus of claim 1, further comprising:
   a determiner that finds a likelihood of the hard decision data and determines the reliability of the hard decision data based on a result of a comparison of the likelihood to a threshold,
   wherein the controller switches between updating and not updating the weights depending on the reliability determined by the determiner.

3. The wireless communication apparatus of claim 2, wherein the determiner employs different thresholds, depending on the modulation scheme of the received signal, to perform the comparison.

4. The wireless communication apparatus of claim 1, further comprising:
   a determiner that finds a received power of the received signal and determines the reliability of the hard decision data based on a result of a comparison of the received power to a threshold,
   wherein the controller switches between updating and not updating the weights depending on the reliability determined by the determiner.

5. The wireless communication apparatus of claim 4, wherein the determiner employs different thresholds, depending on the modulation scheme of the received signal, to perform the comparison.

6. The wireless communication apparatus of claim 1, further comprising:
   a second multiplier that multiplies a difference, between the received signal and a reference signal found from the hard decision data, by a coefficient corresponding to the reliability of the hard decision data,
   wherein the controller controls the weights based on the difference multiplied by the coefficient.

7. A radio base station apparatus comprising the wireless communication apparatus of claim 1.

8. A radio mobile station apparatus comprising the wireless communication apparatus of claim 1.

9. A wireless communication method comprising:
   (a) multiplying a plurality of signals received though a plurality of antennas by respective weights provided for directional reception;
   (b) adding the signals multiplied by the weights to obtain a received signal;
   (c) performing a hard decision of the received signal to obtain hard decision data; and
   (d) controlling the weights by switching between updating and not updating the weights depending on a reliability of the hard decision data.

* * * * *